United States Patent
Nakagawa et al.

(10) Patent No.: US 10,623,536 B2
(45) Date of Patent: Apr. 14, 2020

(54) INFORMATION PROCESSING APPARATUS AND INFORMATION PROCESSING METHOD

(71) Applicant: SONY CORPORATION, Tokyo (JP)

(72) Inventors: Yusuke Nakagawa, Kanagawa (JP); Ikuo Yamano, Tokyo (JP); Ayumi Kato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/340,321

(22) PCT Filed: Oct. 16, 2017

(86) PCT No.: PCT/JP2017/037380
§ 371 (c)(1),
(2) Date: Apr. 8, 2019

(87) PCT Pub. No.: WO2018/092482
PCT Pub. Date: May 24, 2018

(65) Prior Publication Data
US 2019/0260860 A1    Aug. 22, 2019

(30) Foreign Application Priority Data

Nov. 15, 2016   (JP) .................. 2016-222049

(51) Int. Cl.
*H04M 1/02* (2006.01)
*B06B 1/04* (2006.01)
(Continued)

(52) U.S. Cl.
CPC ............. *H04M 1/0202* (2013.01); *B06B 1/04* (2013.01); *B06B 1/12* (2013.01); *G06F 1/1694* (2013.01);
(Continued)

(58) Field of Classification Search
CPC ........ H04M 1/0202; H04M 1/02; H04M 1/00; H04M 1/72569; G06F 3/016;
(Continued)

(56) References Cited

U.S. PATENT DOCUMENTS

| | | |
|---|---|---|
| 9,396,629 B1 | 7/2016 | Weber |
| 2013/0099907 A1 | 4/2013 | Ching et al. |

(Continued)

FOREIGN PATENT DOCUMENTS

| | | |
|---|---|---|
| CN | 103064509 A | 4/2013 |
| EP | 2587343 A1 | 5/2013 |

(Continued)

OTHER PUBLICATIONS

International Search Report and Written Opinion of PCT Application No. PCT/JP2017/037380, dated Nov. 14, 2017, 7 pages of ISRWO.

*Primary Examiner* — Marisol Figueroa
(74) *Attorney, Agent, or Firm* — Chip Law Group

(57) ABSTRACT

Controlling a direction in which a housing is to be vibrated causes a user to easily recognize that the housing is vibrating. An information processing apparatus includes a housing, a sensor, a vibration unit, and a control unit. The housing has a first direction, and a second direction different from the first direction. The sensor is provided in the housing. The vibration unit is capable of vibrating the housing in the first direction and the second direction. The control unit determines a current situation of the housing on a basis of output from the sensor, and controls, on a basis of the current situation of the housing, the vibration unit to vibrate the housing in one of the first direction and the second direction.

19 Claims, 10 Drawing Sheets

(51) Int. Cl.
    *G06F 1/16*     (2006.01)
    *G06F 1/3209*   (2019.01)
    *G06F 3/01*     (2006.01)
    *H04M 1/00*     (2006.01)
    *B06B 1/12*     (2006.01)
    *G06F 1/32*     (2019.01)

(52) U.S. Cl.
    CPC .............. *G06F 1/32* (2013.01); *G06F 1/3209*
        (2013.01); *G06F 3/01* (2013.01); *G06F 3/016*
        (2013.01); *H04M 1/00* (2013.01); *H04M 1/02*
                                                    (2013.01)

(58) Field of Classification Search
    CPC ........ G06F 1/3209; G06F 1/1694; G06F 1/32;
                    G06F 3/01; B06B 1/12; B06B 1/04
    See application file for complete search history.

(56)              References Cited

U.S. PATENT DOCUMENTS

2014/0135074 A1* 5/2014 Manzen .............. H04M 19/047
                                                    455/567
2016/0328930 A1  11/2016 Weber

FOREIGN PATENT DOCUMENTS

JP         2013-092513 A    5/2013
KR      10-2013-0045130 A   5/2013
TW          201317831 A     5/2013

* cited by examiner

| | ON | OFF |
|---|---|---|
| Vibration energy saving mode | | |
| Placing energy saving mode | | |
| Holding energy saving mode | | |
| In-pocket energy saving mode | | |
| Notification vibration energy saving mode | | |
| Game action vibration energy saving mode | | |
| Music rhythm vibration energy saving mode | | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/037380 filed on Oct. 16, 2017, which claims priority benefit of Japanese Patent Application No. JP 2016-222049 filed in the Japan Patent Office on Nov. 15, 2016. Each of the above-referenced applications is hereby incorporated herein by reference in its entirety.

TECHNICAL FIELD

The present technology relates to a technology for vibrating a housing of an information processing apparatus such as a mobile apparatus.

BACKGROUND ART

A mobile apparatus such as a mobile phone (e.g., smartphone) and a portable game machine often has a built-in vibration device that vibrates a housing for informing a user of the incoming call or give the user feedback on an operation.

As the vibration device, in general, an eccentric motor with an eccentric weight mounted on a rotating shaft, a linear resonant actuator (LRA) using resonance, a piezoelectric actuator using expansion and contraction by a piezoelectric device, or the like is used (see the following Patent Literature 1).

CITATION LIST

Patent Literature

Patent Literature 1: Japanese Patent Application Laid-open No. 2015-116508

DISCLOSURE OF INVENTION

Technical Problem

In an information processing apparatus such as a mobile apparatus, a technology capable of causing, by controlling the direction in which a housing is to be vibrated, a user to easily recognize that the housing is vibrating is desired.

In view of the circumstances as described above, it is an object of the present technology to provide a technology capable of causing, by controlling the direction in which a housing is to be vibrated, a user to easily recognize that the housing is vibrating.

Solution to Problem

In order to achieve the above-mentioned object, an information processing apparatus according to the present technology includes a housing; a sensor; a vibration unit, and a control unit.

The housing has a first direction, and a second direction different from the first direction.

The sensor is provided in the housing.

The vibration unit is capable of vibrating the housing in the first direction and the second direction.

The control unit determines a current situation of the housing on a basis of output from the sensor, and controls, on a basis of the current situation of the housing, the vibration unit to vibrate the housing in one of the first direction and the second direction.

Since this information processing apparatus is capable of controlling, on the basis of the current situation of the housing, the direction in which the housing is to be vibrated, it is possible to cause the user to easily recognize that the housing is vibrating.

In the information processing apparatus, the control unit may determine, on a basis of the output from the sensor, whether or not the housing is placed in a certain place, and vibrate, where the housing is placed in the certain place, the housing in one direction of the first direction and the second direction, the one direction being closer to a direction of gravity.

In this information processing apparatus, the vibration of the housing is more likely to be transmitted to the place where the housing is placed, and the user is capable of easily recognizing that the housing is vibrating even in the case where the user is away from the information processing apparatus.

In the information processing apparatus, the housing may have a thickness direction. In this case, the first direction may be the thickness direction, and the second direction may be a specific direction in a plane orthogonal to the thickness direction.

Also in this information processing apparatus, the vibration of the housing is more likely to be transmitted to the place where the housing is placed, and the user is capable of easily recognizing that the housing is vibrating even in the case where the user is away from the information processing apparatus.

In the information processing apparatus, in the case where the housing may have a thickness direction, the first direction and the second direction may be directions orthogonal to each other in a plane orthogonal to the thickness direction.

Also in this information processing apparatus, the vibration of the housing is more likely to be transmitted to the place where the housing is placed, and the user is capable of easily recognizing that the housing is vibrating even in the case where the user is away from the information processing apparatus.

In the information processing apparatus, the housing may have a short side direction and a long side direction in the plane. In this case, the first direction may be the short side direction, and the second direction may be the long side direction.

Also in this information processing apparatus, the vibration of the housing is more likely to be transmitted to the place where the housing is placed, and the user is capable of easily recognizing that the housing is vibrating even in the case where the user is away from the information processing apparatus.

In the information processing apparatus, the control unit may determine, where the housing is placed in the certain place, whether or not both of the first direction and the second direction are away from the direction of gravity by a predetermined angle or more, and vibrate, where the both of the first direction and the second direction are away from the direction of gravity by the predetermined angle or more, the housing in the direction of gravity with composite vibration in the first direction and the second direction.

Accordingly, also in the case where both the first direction and the second direction are separated from the direction of gravity by the predetermined angle or more, it is possible to appropriately vibrate the housing in the direction of gravity.

In the information processing apparatus, the control unit may determine, on a basis of the output from the sensor, whether or not the housing is held by a user's hand, and vibrate, where the housing is held by the user's hand, the housing in one direction of the first direction and the second direction, the one direction being closer to a horizontal direction.

In this information processing apparatus, the user is capable of easily recognizing, when the user is holding the housing, that the housing is vibrating. Note that a person has such a characteristic that he/she is likely to sense, when holding the housing, vibration in a horizontal direction (particularly, a lateral direction viewed from the user).

In the information processing apparatus, in the case where the housing has a thickness direction, the first direction may be the thickness direction, and the second direction may be a first specific direction in a plane orthogonal to the thickness direction.

Also in this information processing apparatus, the user is capable of easily recognizing, when the user is holding the housing, that the housing is vibrating.

In the information processing apparatus, the housing may have a third direction different from the first direction and the second direction. In this case, the third direction may be a second specific direction orthogonal to the first specific direction in the plane orthogonal to the thickness direction, and the vibration unit may not be configured to be capable of vibrating the housing in the second specific direction. In this case, the control unit may vibrate, where the second specific direction in which the vibration unit cannot vibrate the housing among the thickness direction, the first specific direction in the plane, and the second specific direction in the plane is the closest to the horizontal direction, the housing in the thickness direction.

Here, in the case where the second specific direction is the closest to the horizontal direction, it is most effective to vibrate the housing in the second specific direction. However, in the case where the housing cannot be vibrated in the second specific direction closes to the horizontal direction, it may be vibrated in the thickness direction a person is likely to sense vibration next to the second specific direction as in this information processing apparatus.

In the information processing apparatus, in the case where the housing has a thickness direction, the first direction and the second direction may be direction orthogonal to each other in a plane orthogonal to the thickness direction.

Also in this information processing apparatus, the user is capable of easily recognizing, when the user is holding the housing, that the housing is vibrating.

In the information processing apparatus, in the case where the housing has a short side direction and a long side direction in the plane, the first direction may be the short side direction, and the second direction may be the long side direction.

Also in this information processing apparatus, the user is capable of easily recognizing, when the user is holding the housing, that the housing is vibrating.

In the information processing apparatus, the control unit may determine, where the housing is held by a user's hand, whether or not both of the first direction and the second direction are away from the horizontal direction by a predetermined angle or more, and vibrate, where the both of the first direction and the second direction are away from the horizontal direction by the predetermined angle or more, the housing in the horizontal direction with composite vibration in the first direction and the second direction.

Accordingly, also in the case where both the first direction and the second direction are separated from the horizontal direction by the predetermined angle or more, it is possible to appropriately vibrate the housing in the horizontal direction.

In the information processing apparatus, in the case where the housing has a thickness direction, the first direction may be the thickness direction. In this case, the control unit may determine, on a basis of the output from the sensor, whether or not the housing is put in a receptacle of clothing of a user, and vibrate, where the housing is put in the receptacle, the housing in the thickness direction.

In this information processing apparatus, the user is capable of easily recognizing, in the case where the housing has been in a receptacle (so-called pocket) of clothing, that the housing is vibrating. Note that a person has such a characteristic that he/she is likely to sense, in the case where the housing has been in the receptacle of clothing, vibration in the thickness direction.

In the information processing apparatus, the control unit may switch between a first mode and a second mode on a basis of the current situation of the housing, the housing being vibrated in one of the first direction and the second direction in the first mode, the housing being vibrated in both the first direction and the second direction regardless of the current situation of the housing in the second mode.

In the information processing apparatus, the control unit may determine whether or not a predetermined time has elapsed since processing of vibrating the housing in the first mode is started, and switch, where there is no response from a user even after the predetermined time has elapsed, the first mode to the second mode.

Accordingly, it is possible to cause the user who does not notice that the housing is vibrating to appropriately notice that the housing is vibrating.

In the information processing apparatus, the control unit may switch between the first mode and the second mode on a basis of an instruction from a user.

Accordingly, the user is capable of arbitrarily switch between the first mode and the second mode.

In the information processing apparatus, the housing may have a third direction different from the first direction and the second direction, and the vibration unit may be capable of vibrating the housing in the third direction. IN this case, the control unit may control, on a basis of the current situation of the housing, the vibration unit to vibrate the housing in one of the first direction, the second direction, and the third direction.

An information processing apparatus according to the present technology includes a control unit. The control unit determines, on a basis of output from a sensor provided in a housing having a first direction, and a second direction different from the first direction, a current situation of the housing, and controls a vibration unit capable of vibrating, on a basis of the current situation of the housing, the housing in the first direction and the second direction so that the housing is vibrated in one of the first direction and the second direction.

An information processing method according to the present technology includes
determining, on a basis of output from a sensor provided in a housing having a first direction, and a second direction different from the first direction, a current situation of the housing, and controlling a vibration unit capable of vibrating, on a basis of the current situation of the housing, the housing in the first direction and the second direction so that the housing is vibrated in one of the first direction and the second direction.

A program according to the present technology causes a computer to execute the steps of:

determining, on a basis of output from a sensor provided in a housing having a first direction, and a second direction different from the first direction, a current situation of the housing, and controlling a vibration unit capable of vibrating, on a basis of the current situation of the housing, the housing in the first direction and the second direction so that the housing is vibrated in one of the first direction and the second direction.

Advantageous Effects of Invention

As described above, in accordance with the present technology, it is possible to provide a technology capable of causing, by controlling the direction in which a housing is to be vibrated, a user to easily recognize that the housing is vibrating.

MODE(S) FOR CARRYING OUT THE INVENTION

Hereinafter, embodiments of the present technology will be described with reference to the drawings.

<First Embodiment>

[Configuration of Entire Smartphone 20 and Configuration of Respective Units]

Figure 1:
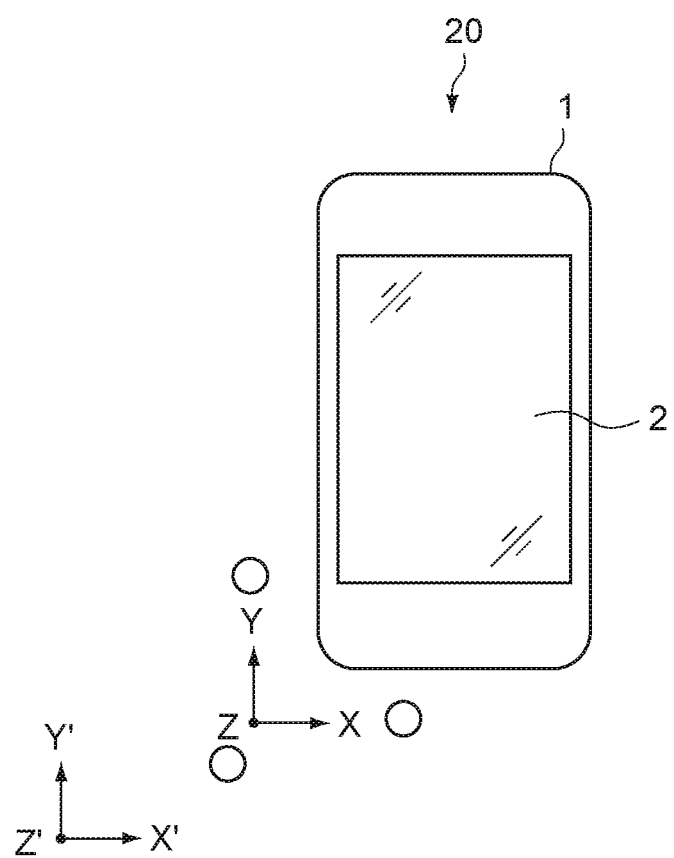
FIG. 1 is a front view showing a smartphone according to a first embodiment of the present technology.

FIG. 1 is a front view showing a smartphone 20 according to a first embodiment of the present technology.

As shown in FIG. 1, the smartphone 20 according to this embodiment includes a housing 1 having such a size that a user is capable of holding it by one hand. This housing 1 has a rectangular shape when viewed from the front, and the shape is short in the short side direction (X axis direction), long in the long side direction (Y axis direction), and thin in a thickness direction (Z axis direction).

Note that in the description in the present specification, description will be made with three axes orthogonal to each other in the coordinate system (housing coordinate system) based on this housing 1 as XYZ axes. Meanwhile, description will be made with three axes orthogonal to each other in the coordinate system (earth coordinate system) based on the earth as X'Y'Z' axes.

In the housing coordinate system, the X axis direction is the short side direction of the housing 1, the Y axis direction is the long side direction of the housing 1, and the Z axis direction is the thickness direction of the housing 1. Meanwhile, in the earth coordinate system, the X' axis direction and the Y' axis direction are each an arbitrary direction in the horizontal direction, and the Z' axis direction is the direction of gravity.

A display unit 2 is provided over the major part of the front side of the housing 1. On the display unit 2, a proximity sensor 3 (see FIG. 2) that detects proximity of a user's finger, a stylus pen, or the like is integrally provided. Further, an earpiece (not shown) is provided in the vicinity of the upper end part of the front side of the housing 1, and a mouthpiece (not shown) is provided in the vicinity of the lower end part of the front side of the housing 1.

The display unit 2 includes, for example, a liquid crystal display, an EL (Electro-Luminescence) display, or the like. As the proximity sensor 3, for example, a sensor using a resistive film method or electrostatic capacitance method is used.

Figure 2:
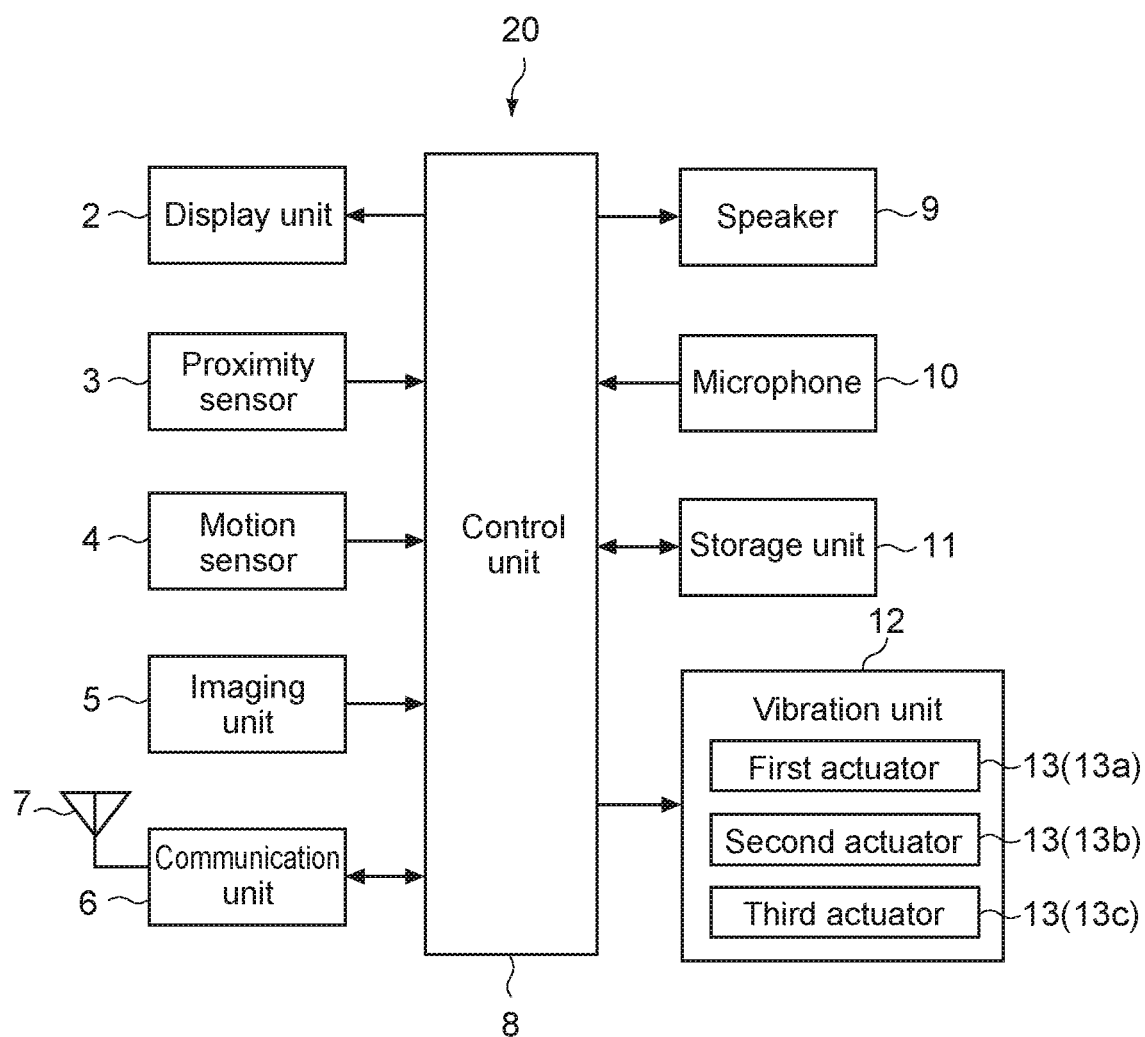
FIG. 2 is a block diagram showing an electrical configuration of the smartphone.

FIG. 2 is a block diagram showing an electrical configuration of the smartphone 20. As shown in FIG. 2, the smartphone 20 includes, in addition to the display unit 2 and the proximity sensor 3 described above, a motion sensor 4, an imaging unit 5, a communication unit 6, an antenna 7, a control unit 8, a speaker 9, a microphone 10, a storage unit 11, and a vibration unit 12.

The motion sensor 4 is a sensor for detecting the movement or posture of the housing 1. Examples of the motion sensor 4 include an acceleration sensor, an angular sensor, a geomagnetic sensor, and a pressure sensor (two or more of them may be combined).

The imaging unit 5 includes an optical system such as an objective lens and an imaging lens, and an image sensor such as a CMOS (Complementary Metal Oxide Semiconductor) sensor and a CCD (Charge Coupled Device) sensor, which converts light taken through this optical system into an electric signal. The imaging unit 5 generates image data from the signal obtained by imaging by the image sensor, and supplies the data to the control unit 8.

The communication unit 6 executes processing such as frequency conversion of radio waves transmitted/received to/from the antenna 7, modulation, and demodulation. The antenna 7 transmits/receives radio waves for telephone calls, and radio waves for packet communication, e.g., for e-mail and Web data.

The speaker 9 includes a digital/analog converter, an amplifier, and the like. The speaker 9 executes digital/analog conversion processing and amplification processing on audio data for telephone calls input from the control unit 8, and outputs voice via the earpiece.

The microphone 10 includes an analog/digital converter and the like. The microphone 10 converts analog audio data input via the mouthpiece from the user into digital audio data, and outputs the data to the control unit 8. The digital audio data output to the control unit 8 is encoded, and then transmitted via the communication unit 6 and the antenna 7.

The storage unit 11 includes a volatile memory used as a work area of the control unit 8, and a non-volatile memory in which various programs necessary for processing of the control unit 8 are to be stored. The above-mentioned various programs may be read from a portable recording medium such as an optical disc and a semiconductor memory, or downloaded from a server apparatus on a network.

The vibration unit 12 is configured to be capable of vibrating the housing 1 in the three axial directions in the housing coordinate system. That is, in this embodiment, the vibration unit 12 is capable of vibrating the housing 1 in the three axial directions, i.e., the short side direction, the long side direction, the thickness direction of the housing 1. In this embodiment, the vibration unit 12 includes three linear vibration-type actuators 13.

A first actuator 13*a* is a member for vibrating the housing 1 in the short side direction (X axis direction), and a second actuator 13*b* is a member for vibrating the housing 1 in the long side direction (Y axis direction). Further, a third actuator 13*c* is a member for vibrating the housing 1 in the thickness direction (Z axis direction). As these three linear vibration-type actuators 13, for example, a linear resonant actuator (LRA) using resonance, a piezoelectric actuator using expansion and contraction by a piezoelectric device, or the like is used These three actuators 13 may be collectively housed in the housing 1 as long as space for collectively housing the actuators in one place can be ensured in the housing 1. Meanwhile, in the case where it is difficult to ensure space for collectively housing the three actuators 13 in one place due to restriction on the arrangement of various parts, the three actuators 13 may be separated from each other and housed in the housing 1.

The control unit 8 includes a CPU (Central Processing Unit) and the like. The control unit 8 executes various arithmetic operations on the basis of various programs stored in the storage unit 11, and integrally controls the respective units of the smartphone 20. The specific processing of this control unit 8 will be described below in detail.

[Operation of Control Unit 8]

Figure 3:
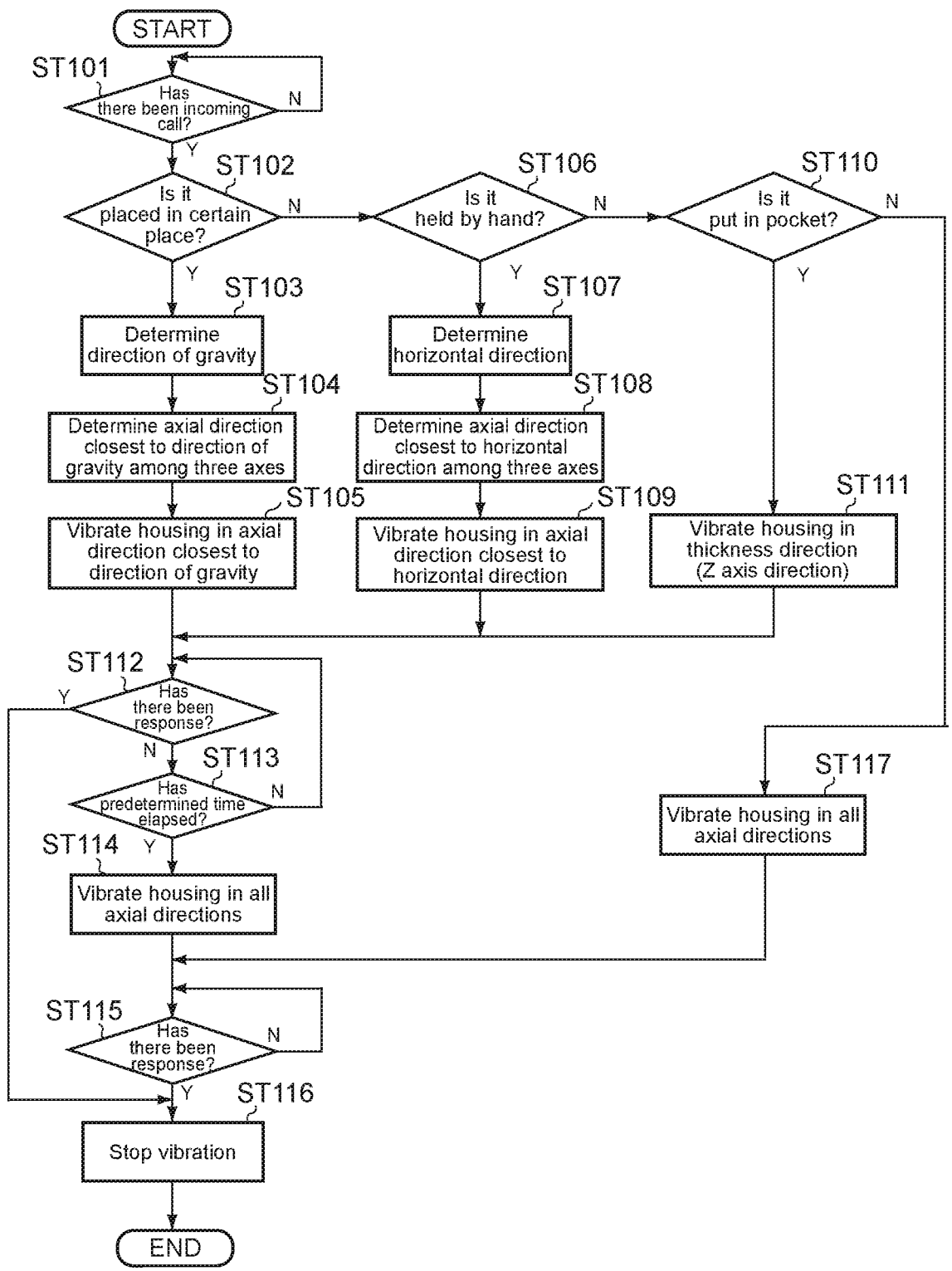
FIG. 3 is a flowchart showing processing of a control unit.

FIG. 3 is a flowchart showing processing of the control unit 8. First, the control unit 8 determines whether or not there has been an incoming call by a telephone call (Step 101). In the case where there has been an incoming call (YES in Step 101), the control unit 8 determines, on the basis of output from the motion sensor 4, whether or not the housing 1 is placed in a certain place (e.g., on a table, on a floor, etc.) (Step 102).

In the case where the housing 1 is placed in a certain place, e.g., on a table or a floor, the housing 1 hardly moves. Therefore, the control unit 8 is capable of determining, on the basis of output from the motion sensor 4, whether or not the housing 1 is placed in a certain place.

In the case where the housing 1 is placed in a certain place (YES in Step 102), the control unit 8 determines, on the basis of output from the motion sensor 4, the direction of gravity (Z' axis direction in the earth coordinate system) (Step 103). Next, the control unit 8 determines which axial direction of the three axial directions, i.e., the short side direction(X axis direction), the long side direction(Y axis direction), and the thickness direction (Z axis direction) in the housing coordinate system, is the closest to the direction of gravity (Step 104).

When determining the axial direction closest to the direction of gravity, the control unit 8 controls the vibration unit 12 to vibrate the housing 1 in the determined axial direction (Step 105). Note that in the case where there are two or more axes closest to the direction of gravity among the three axial directions in the housing coordinate system (superiority is not obtained), the control unit 8 vibrates the housing 1 in the direction of one of the two or more axes. Alternatively, the control unit 8 may vibrate the housing 1 in all directions of the two or more axes.

Figure 4:
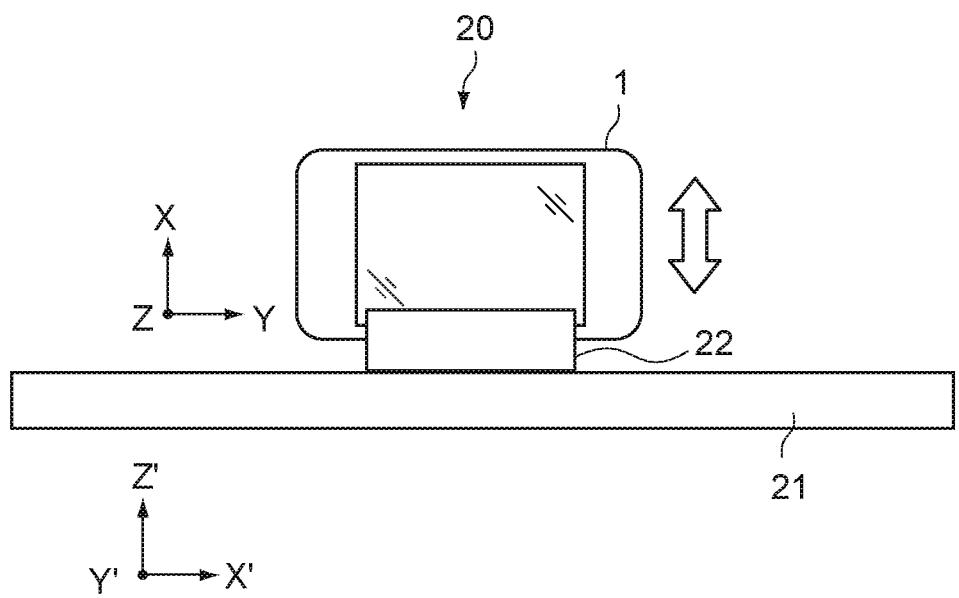
FIG. 4 is a diagram showing a state where a housing is placed on a table in such a way that the short side direction matches the direction of gravity.

FIG. 4 is a diagram showing a state where the housing 1 is placed on a table 21 in such a way that the short side direction matches the direction of gravity. In the example shown in FIG. 4, the housing 1 is placed on a cradle 22 provided on the table 21.

As shown in FIG. 4, in the case where the housing 1 is placed in such a way that the short side direction matches the direction of gravity, the control unit 8 determines that among the three axial directions in the housing coordinate system, the short side direction is the closest to the direction of gravity (Step 104). In this case, the control unit 8 vibrates only the first actuator 13*a* among the three actuators 13 in the vibration unit 12 to vibrate the housing 1 in the short side direction (X axis direction) (Step 105).

Figure 5:
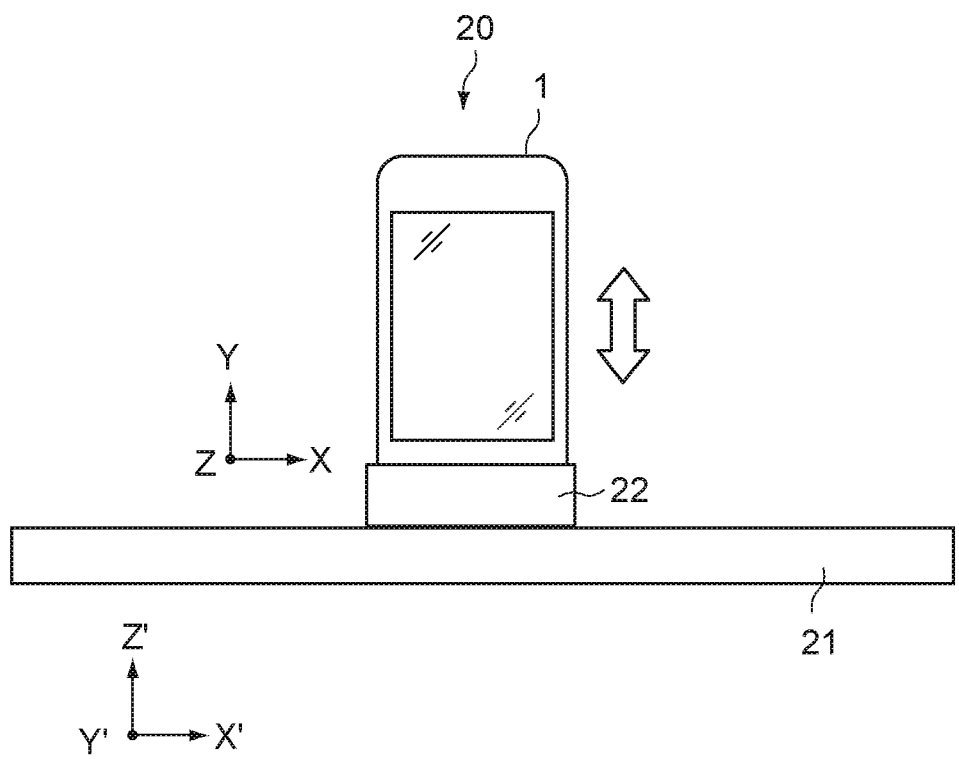
FIG. 5 is a diagram showing a state where the housing is placed on the table in such a way that the long side direction matches the direction of gravity.

FIG. 5 is a diagram showing a state where the housing 1 is placed on the table 21 in such a way that the long side direction matches the direction of gravity. In the example shown in FIG. 5, the housing 1 is placed on the cradle 22 provided on the table 21.

As shown in FIG. 5, in the case where the housing 1 is placed in such a way that the long side direction matches the direction of gravity, the control unit 8 determines that among the three axial directions in the housing coordinate system, the long side direction is the closest to the direction of gravity (Step 104). In this case, the control unit 8 drives only the second actuator 13*b* among the three actuators 13 in the vibration unit 12 to vibrate the housing 1 in the long side direction (Y axis direction) (Step 105).

Figure 6:
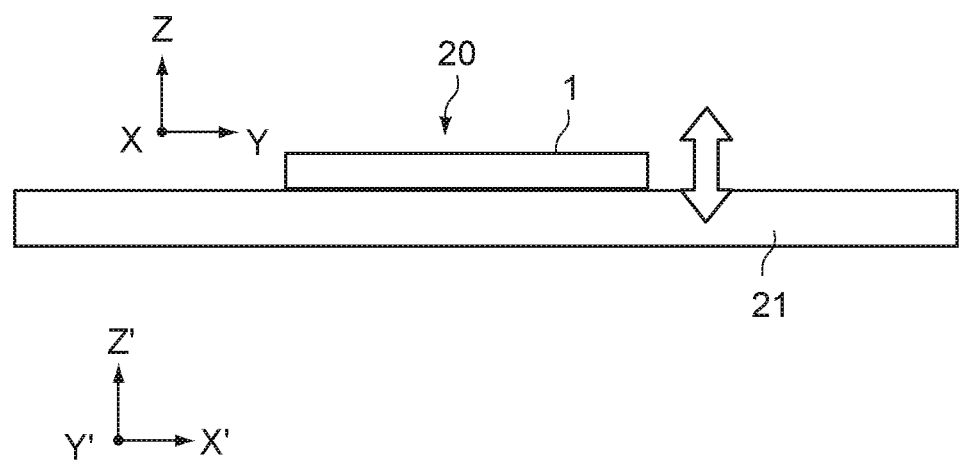
FIG. 6 is a diagram showing a state where the housing is placed on the table in such a way that the thickness direction matches the direction of gravity.

FIG. 6 is a diagram showing a state where the housing 1 is placed on the table 21 in such a way that the thickness direction matches the direction of gravity.

As shown in FIG. 6, in the case where the housing 1 is placed on the table 21 in such a way that the thickness direction (Z axis direction) matches the direction of gravity (Z' axis direction), the control unit 8 determines that among the three axial directions in the housing coordinate system, the thickness direction is the closet to the direction of gravity (Step 104). In this case, the control unit 8 vibrates only the third actuator 13*c* among the three actuators 13 in the vibration unit 12 to vibrate the housing 1 in the thickness direction (Z axis direction) (Step 105).

In the case where it is determined in Step 102 that the housing 1 is not placed in the certain place (NO in Step 102), the control unit 8 determines whether or not the housing 1 is held by a user's hand (Step 106).

In the case where the housing 1 is held by a user's hand, the housing 1 moves in small increments. Therefore, the control unit 8 is capable of determining, on the basis of output from the motion sensor 4, whether or not the housing 1 is held by a user's hand.

In the case where the housing 1 is held by a user's hand (YES in Step 106), the control unit 8 determines, on the basis of output from the motion sensor 4, the horizontal direction (direction in the X'Y' plane in the earth coordinate system) (Step 107). Next, the control unit 8 determines which axial direction of the three axial directions, i.e., the short side direction(X axis direction), the long side direction(Y axis direction), and the thickness direction (Z axis direction) in the housing coordinate system, is the closest to the horizontal direction (Step 108).

When determining the axial direction closest to the horizontal direction, the control unit 8 controls the vibration unit 12 to vibrate the housing 1 in the determined axial direction (Step 109). Note that in the case where there are two or more axes closest to the horizontal direction among the three axial directions in the housing coordinate system (superiority is not obtained), the control unit 8 vibrates the housing 1 in the direction of one of the two or more axes. Alternatively, the control unit 8 may vibrate the housing 1 in all directions of the two or more axes.

Figure 7:
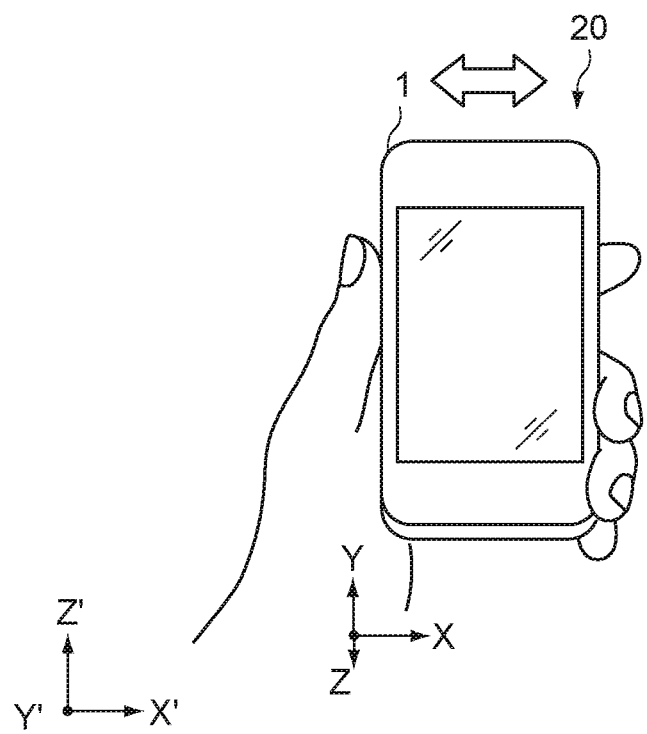
FIG. 7 is a diagram showing a state where the user holds the housing vertically.

FIG. 7 is a diagram showing a state where the user holds the housing 1 vertically. In the example shown in FIG. 7, the short side direction (X axis direction) of the housing 1 matches the horizontal direction (direction in the X'Y' plane). Note that in FIG. 7, the long side direction (Y axis direction) of the housing 1 is inclined with respect to the direction of gravity (Z' axis direction).

For example, the user holds the housing 1 by one hand as shown in FIG. 7, and hears music or searches for web information.

As shown in FIG. 7, in the case where the housing 1 is held by a user's hand in such a way that the short side direction matches the horizontal direction, the control unit 8 determines that among the three axial directions in the housing coordinate system, the short side direction is the closest to the horizontal direction (Step 108). In this case, the control unit 8 drives only the first actuator 13*a* among the three actuators 13 in the vibration unit 12 to vibrate the housing 1 in the short side direction (X axis direction) (Step 109).

Figure 8:
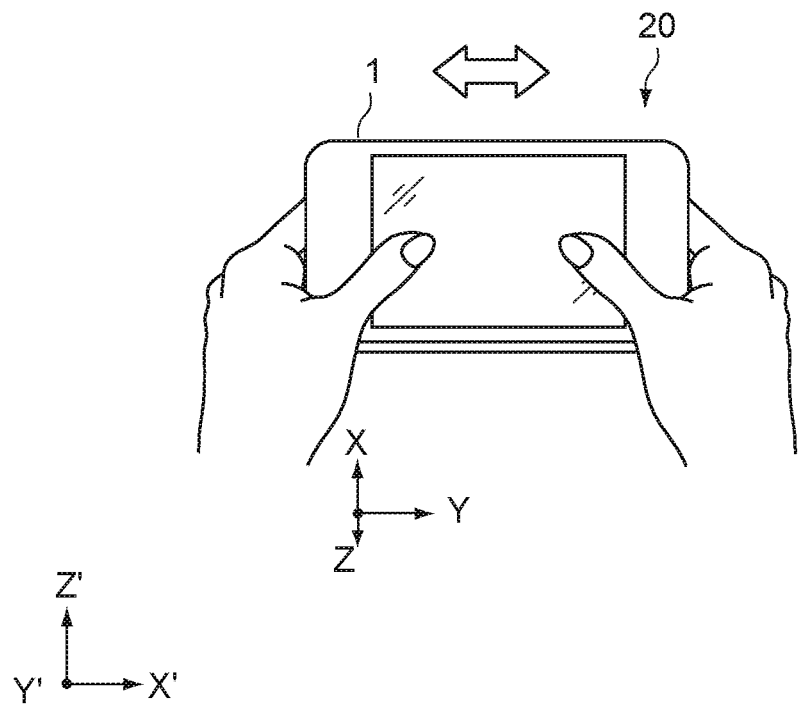
FIG. 8 is a diagram showing a state where the user holds the housing horizontally.

FIG. 8 is a diagram showing a state where the user holds the housing 1 horizontally. In the example shown in FIG. 7, the long side direction (Y axis direction) of the housing 1 matches the horizontal direction (direction in the X'Y' plane). Note that in FIG. 8, the short side direction (X axis direction) of the housing 1 is inclined with respect to the direction of gravity (Z' axis direction).

For example, the user holds the housing 1 by both hands as shown in FIG. 8, and plays a game or views a movie.

As shown in FIG. 8, in the case where the housing 1 is held by a user's hand in such a way that the long side direction matches the horizontal direction, the control unit 8 determines that among the three axial directions in the housing coordinate system, the long side direction is the closest to the horizontal direction (Step 108). In this case, the control unit 8 vibrates only the second actuator 13*b* among the three actuators 13 in the vibration unit 12 to vibrate the housing 1 in the long side direction (X axis direction) (Step 109).

Here, it is rare that the thickness direction (Z axis direction) of the housing 1 is the closest to the horizontal direction (direction in the X'Y' plane) when the housing 1 is held by a user. However, in such a case, the housing 1 is vibrated in the thickness direction of the housing 1.

In the case where it is determined in Step 106 that the housing 1 is not held by a user's hand (NO in Step 106), the control unit 8 determines whether or not the housing 1 is put in a receptacle (so-called pocket) of clothing of the user (Step 110).

Figure 9:
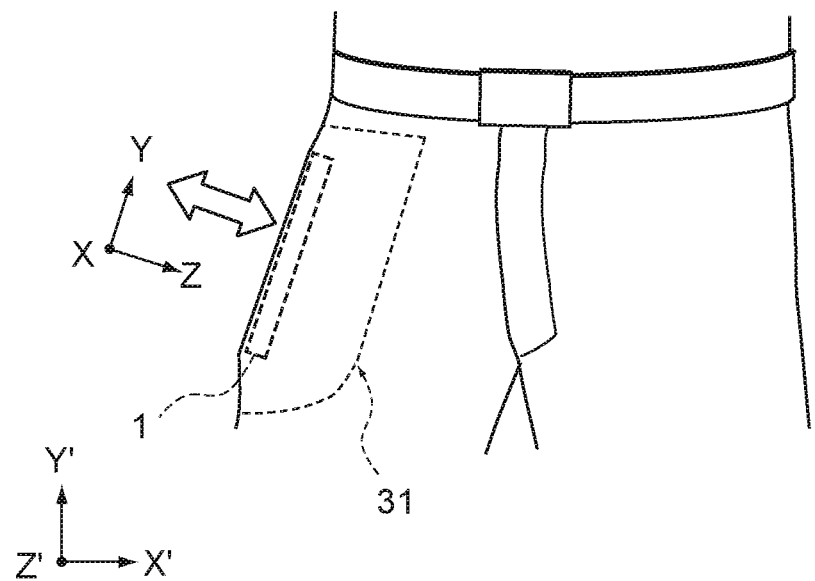
FIG. 9 is a diagram showing a state where a housing 1 is put in a receptacle of clothing of the user.

FIG. 9 is a diagram showing a state where the housing 1 is put in a receptacle 31 of the clothing of the user. The determination of whether or not the housing 1 is put in the receptacle 31 of the clothing of the user is performed on the basis of proximity data or the like acquired from the proximity sensor 3. That is, since the surface on the side of the display unit 2 on which the proximity sensor 3 is provided approaches the fabric surface in the receptacle 31 when the housing 1 is in the receptacle 31 of the clothing, the control unit 8 is capable of determining, on the basis of the proximity data, whether or not the housing 1 is in the receptacle 31.

Further, when the housing 1 is in the receptacle 31 of the clothing, the amount of light received by the image sensor (CCD sensor or the like) of the imaging unit 5 is significantly reduced. Therefore, the control unit 8 is capable of determining, on the basis of the value of brightness of movie, e.g., average luminance, acquired by the imaging unit 5, whether or not the housing 1 is in the receptacle 31. Alternatively, such determination may be performed using both the proximity data and the value of brightness of movie.

In the case where the housing 1 is put in the receptacle 31 of the clothing of the user (YES in Step 110), the control unit 8 drives only the third actuator 13*c* among the three actuators 13 in the vibration unit 12 to vibrate the housing 1 in the thickness direction (Z axis direction) (Step 111).

After starting vibration of the housing 1 in Steps 105, 109, and 111, the control unit 8 determines whether or not there has been a response from the user to the incoming call (Step 112). In the case where there has been a response from the user (YES in Step 112), the control unit 8 stops the vibration of the housing 1 by the vibration unit 12 (Step 116), and finishes the processing.

Meanwhile, in the case where there has been no response from the user (NO in Step 112), the control unit 8 determines whether or not a predetermined time has elapsed from the start of vibration by the vibration unit 12 (Step 113). This predetermined time is, for example, approximately 10 seconds to 20 seconds.

In the case where the predetermined time has not elapsed (NO in Step 113), the processing returns to Step 112 again, and the control unit 8 determines whether or not there has been a response from the user.

In the case where the predetermined time has elapsed since the start of vibration by the vibration unit 12 while receiving no response from the user (YES in Step 113), the control unit 8 executes the processing of the next Step 114. In Step 114, the control unit 8 starts driving of the other two actuators 13 other than the currently-driven actuator 13 to vibrate the housing 1 in all the axial directions (i.e., the short side direction, the long side direction, and the thickness direction).

That is, in the case where the predetermined time has elapsed while receiving no response from the user, the control unit 8 switches a first mode in which the housing 1 is vibrated in one axial direction in accordance with the current situation of the housing 1 to a second mode in which the housing 1 is vibrated in three axial directions (which may be two axial directions) regardless of the current situation of the housing 1. Note that the control unit 8 may execute processing of increasing the number of axes to be vibrated one by one for each predetermined time in the case where there has been no response from the user.

When starting the vibration in all the axial directions, the control unit 8 determines whether or not there has been a response from the user (Step 115), and stops, in the case where there has been a response, the vibration (Step 116).

Note that in the case where it is determined in Step 110 that the housing 1 is not put in the receptacle 31 in the clothing of the user (Step 110), the control unit 8 executes the processing of the next Step 117. That is, in the case where the housing 1 is not placed in a certain place, is not held by a hand, and is not put in the receptacle 31 of the clothing, the control unit 8 executes the processing of Step 117. In Step 117, the control unit 8 vibrates the housing 1 in all the axial directions (i.e., the short side direction, the long side direction, and the thickness direction) from the beginning.

[Operations, etc.]

As described above, in this embodiment, in the case where the housing 1 is placed in a certain place, the housing 1 is vibrated in the axial direction closest to the direction of gravity among the three axial directions in the housing coordinate system. Accordingly, the vibration of the housing 1 is more likely to be transmitted to the place where the housing is placed, and the user is capable of easily recognizing that the housing is vibrating even in the case where the user is away from the smartphone 20.

Further, in this embodiment, in the case where the housing 1 is held by a user's hand, the housing 1 is vibrated in the axial direction closest to the horizontal direction among the three axial directions in the housing coordinate system. Accordingly, the user is capable of easily recognizing, when holding the housing 1, that the housing 1 is vibrating. Note that a person has such a characteristic that he/she is likely to sense, when holding the housing 1, vibration in the horizontal direction (particularly, the lateral direction viewed from the user).

Further, in this embodiment, in the case where the housing 1 is put in the receptacle 31 of the clothing of the user, the housing 1 is vibrated in the thickness direction among the three axial directions in the housing coordinate system. Accordingly, the user is capable of easily recognizing, in the case where the housing 1 has been in the receptacle 31 of the clothing, that the housing 1 is vibrating. Note that a person has such a characteristic that he/she is likely to sense, in the case where the housing 1 has been in the receptacle 31 of clothing, vibration in the thickness direction.

As described above, in this embodiment, it is possible to control, on the basis of the current situation of the housing (situation in which the housing 1 is placed in a certain place, is held, or is put in the receptacle 31), the direction in which the housing 1 is to be vibrated. Therefore, it is possible to cause the user to easily recognize that the housing 1 is vibrating.

Further, in this embodiment, since basically only one actuator 13 among the three actuators 13 is vibrated, it is possible to reduce power consumption as compared with the case of vibrating all the actuators 13.

Further, in this embodiment, in the case where the predetermined time has elapsed since the vibration in one axial direction in the housing coordinate system is started while receiving no response from the user, the processing of increasing the number of axes to be vibrated is executed. Accordingly, it is possible to cause the user who does not notice that the housing 1 is vibrating to appropriately notice that the housing 1 is vibrating.

Note that in the above description, the case where the direction in which the housing 1 is vibrated is determined on the basis of which axis is the closest to the horizontal direction in the earth coordinate system among the three axes in the housing coordinate system when the housing 1 is held by a user's hand has been described. Here, in the case where the housing 1 is held by a user's hand, basically, the control unit 8 only needs to be capable of vibrating the housing 1 in the vibration direction that is easy for the user to sense. This can be realized by another method that does not use the earth coordinate system (horizontal direction).

For example, assumption is made that the housing 1 is held as shown in FIG. 7 and the screen is displayed on the display unit 2 vertically. Note that in FIG. 7, the earth coordinate system (X'Y'Z') is ignored. That is, in the earth coordinate system, the housing 1 may take any posture (e.g., the user may sleep sideways and hold the housing 1). In this case, the control unit 8 vibrates, on the basis of the fact that the screen is displayed vertically, the housing 1 in the short side direction (X axis direction).

Further, for example, assumption is made that the housing 1 is held as shown in FIG. 8 and the screen is displayed on the display unit 2 horizontally. Note that in FIG. 8, the earth coordinate system (X'Y'Z') is ignored. That is, in the earth coordinate system, the housing 1 may take any posture. In this case, the control unit 8 vibrates, on the basis of the fact that the screen is displayed horizontally, the housing 1 in the long side direction (Y axis direction).

That is, in the case where the housing 1 is held by the user, the control unit 8 may determine the vibration direction of the housing on the basis of the display orientation (vertical display and horizontal display) of the screen. Note that this applies to each embodiment to be described later (e.g., in a second embodiment to be described later, the housing 1 is vibrated in the short side direction in the case of the vertical display, and the housing 1 is vibrated in the thickness direction in the case of the horizontal display). In accordance with such a way, whatever posture the housing 1 takes, it is possible to vibrate the housing 1 in the vibration direction (particularly, the lateral direction viewed from the user) that is easy for the user to sense.

<Second Embodiment>

Figure 10:
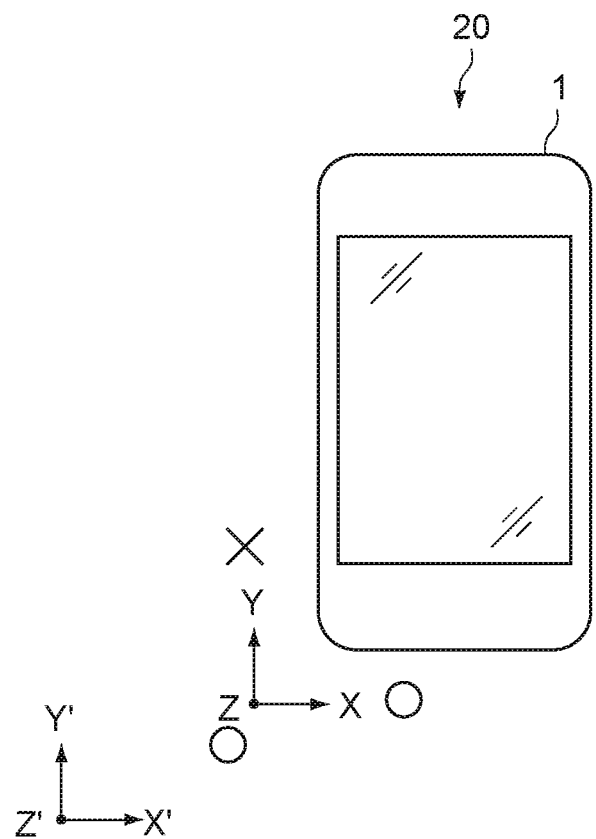
FIG. 10 is a front view showing a smartphone according to a second embodiment of the present technology.

Next, a second embodiment of the present technology will be described. FIG. 10 is a front view showing the smartphone 20 according to the second embodiment.

In the above-mentioned first embodiment, the case where the housing 1 can b vibrated in the three axial directions in the housing coordinate system has been described. Meanwhile, in the second embodiment, although the housing 1 can be vibrated in the two axial directions, i.e., the short side direction (X axis direction) and a thickness direction (Z axis direction) in housing coordinate system (see a circle mark in FIG. 10), the housing 1 cannot be vibrated in the long side direction (Y axis direction) (see a cross mark). That is, in this second embodiment, the second actuator 13b is not installed.

Figure 11:
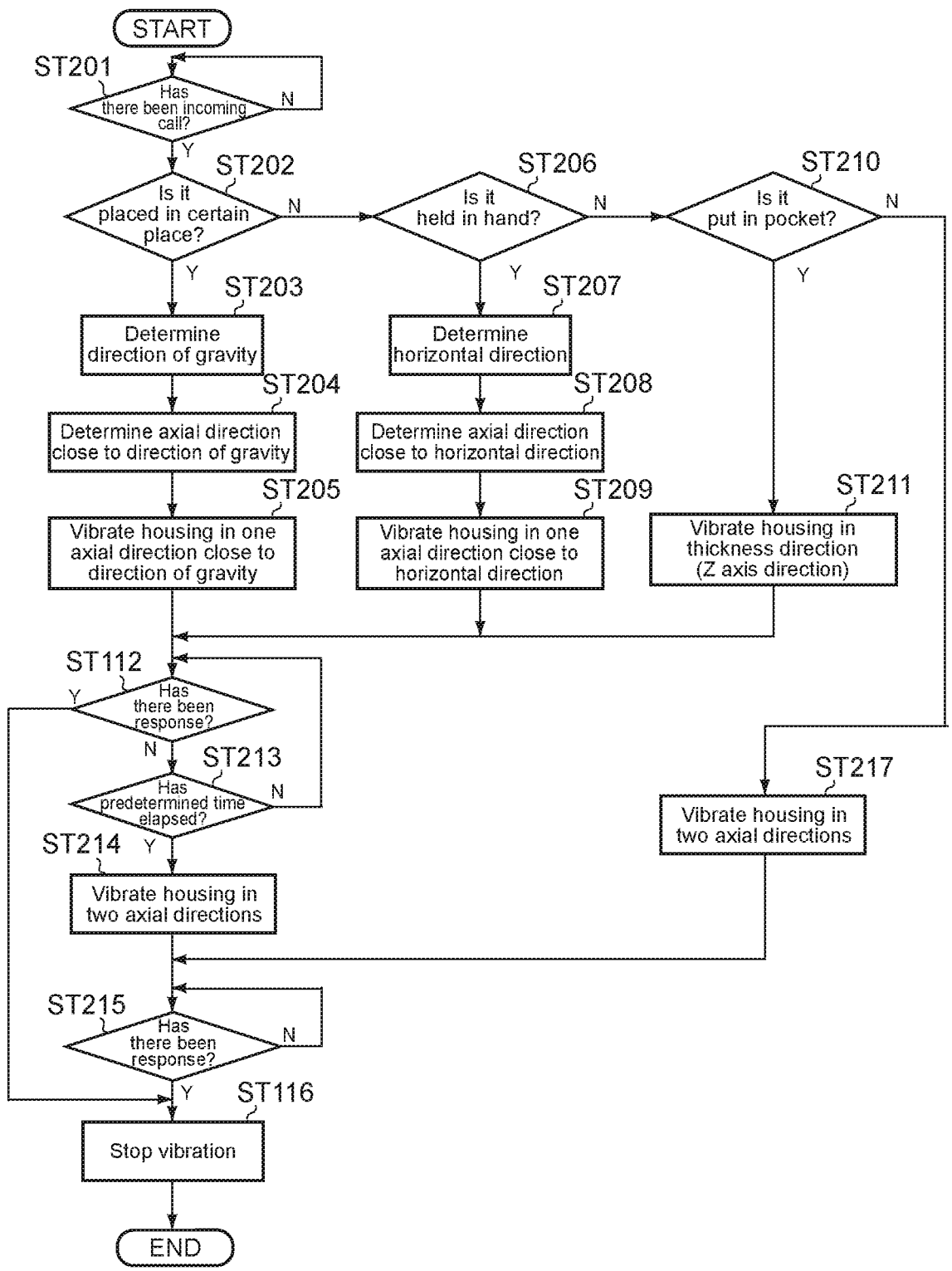
FIG. 11 is a flowchart showing processing of the control unit.

FIG. 11 is a flowchart showing the processing of the control unit 8 according to the second embodiment. In the second embodiment, in the case where there has been an incoming call (YES in Step 201) and the housing 1 is placed in a certain place (YES in Step 202), which of the short side direction (X axis direction) and the thickness direction (Z axis direction) of the housing 1 is closer to the direction of gravity is determined (Step 204).

Then, the housing 1 is vibrated in one axis direction of the short side direction (X axis direction) and the thickness direction (Z axis direction) of the housing 1, which is closer to the direction of gravity (Step 205). For example, in the case where the housing 1 is placed as shown in FIG. 4, since the short side direction (X axis direction) is closer to the direction of gravity (Z' axis direction) than the thickness direction (Z axis direction), the housing 1 is vibrated in the short side direction. Meanwhile, in the case where the housing 1 is placed as shown in FIG. 6, since the thickness direction (Z axis direction) is closer to the direction of gravity (Z' axis direction) than the short side direction (X axis direction), the housing 1 is vibrated in the thickness direction.

Note that in the case where the housing 1 is placed as shown in FIG. 5, since there is no superiority relationship between the short side direction (X axis direction) and the thickness direction (Z axis direction), the housing 1 is vibrated in the axial directions, i.e., both of the short side direction (X axis direction) and the thickness direction (Z axis direction). Alternatively, the housing 1 may be vibrated in one direction set in advance among the short side direction (X axis direction) and the thickness direction (Z axis direction).

Further, in the case where there has been an incoming call and the housing 1 is held by a user's hand (YES in Step 206), which of the short side direction (X axis direction) and the thickness direction (Z axis direction) of the housing 1 is closer to the horizontal direction (Step 208).

Then, the housing 1 is vibrated in one axial direction of the short side direction (X axis direction) and the thickness direction (Z axis direction) of the housing 1, which is closer to the horizontal direction (Step 209). For example, for example, in the case where the housing 1 is held as shown in FIG. 7, since the short side direction (X axis direction) is closer to the horizontal direction (direction in the X'Y' plane) than the thickness direction (Z axis direction), the housing 1 is vibrated in the short side direction.

Meanwhile, the housing 1 is held as shown in FIG. 8, since the thickness direction (Z axis direction) is closer to the horizontal direction (direction in the X'Y' plane) than the short side direction (X axis direction), the housing 1 is vibrated in the thickness direction. Note that a person has such a characteristic that he/she is likely to sense the vibration in the depth direction viewed from the user next to the vibration in the lateral direction viewed from the user (vibration in the longitudinal direction viewed from the user is the most difficult to sense), this vibration method fits into this characteristic.

Here, assumption is made that in FIG. 8, the user has lowered the upper side of the housing 1 in FIG. 8 toward the downward direction, and the housing 1 has been rotated about the Y axis. In this case, in the case where the XY plane of the housing 1 is inclined with respect to the direction of gravity (Z' axis) by 45° or more, the short side direction (X axis direction) of the housing 1 is closer to the horizontal direction than the thickness direction (Z axis direction) of the housing 1. In this case, the housing 1 is vibrated in the short side direction of the housing 1, i.e., the housing 1 is vibrated in the longitudinal direction viewed from the user. However, the vibration in the longitudinal direction viewed from the user is difficult for the user to sense.

Therefore, in such a case, the following processing may be executed. First, the control unit 8 determines which axial direction is the closest to the horizontal direction (direction in the X'Y' plane) among the three axial directions in the housing coordinate system (the short side direction, the long side direction, and the thickness direction). Then, in the case where the axial direction (i.e., the long side direction) closest to the horizontal direction is a direction in which the vibration unit 12 cannot vibrate the housing 1, the control unit 8 vibrates the housing 1 in the thickness direction.

That is, in the case where the long side direction is the closest to the horizontal direction when the housing 1 is held by the user, it is most effective to vibrate the housing 1 in the long side direction. However, in the second embodiment, the housing 1 cannot be vibrated in the long side direction. In such a case, the housing 1 is vibrated in the thickness direction in which a person is likely to sense vibration next to the long side direction. Accordingly, it is possible to cause the user to easily recognize that the housing 1 is vibrating.

Returning to the description of FIG. 11, in the case where the housing 1 is put in the receptacle 31 of the clothing (YES in Step 210) when there has been an incoming call, the housing 1 is vibrated in the thickness direction (Step 211).

Assumption is made that a predetermined time has elapsed without receiving no response from the user (YES in Step 213) since the vibration of the housing 1 is started in Step 205, 209, or 211. In this case, driving of the remaining one actuator 13 other than the currently driven actuator 13 is started, and the housing 1 is vibrated in two axial directions (that is, the short side direction and the thickness direction) (Step 214) (first mode to second mode).

In the case where the housing 1 is not placed in a certain place, is not held by a hand, and is not put in the receptacle 31 of the clothing, (NO in Step 210), the housing 1 is vibrated in the two axial directions (that is, the short side direction and the thickness direction) from the beginning (Step 217).

Also in this second embodiment, the operation and effect similar to those in the above-mentioned first embodiment are exerted.

<Third Embodimen>

Figure 12:
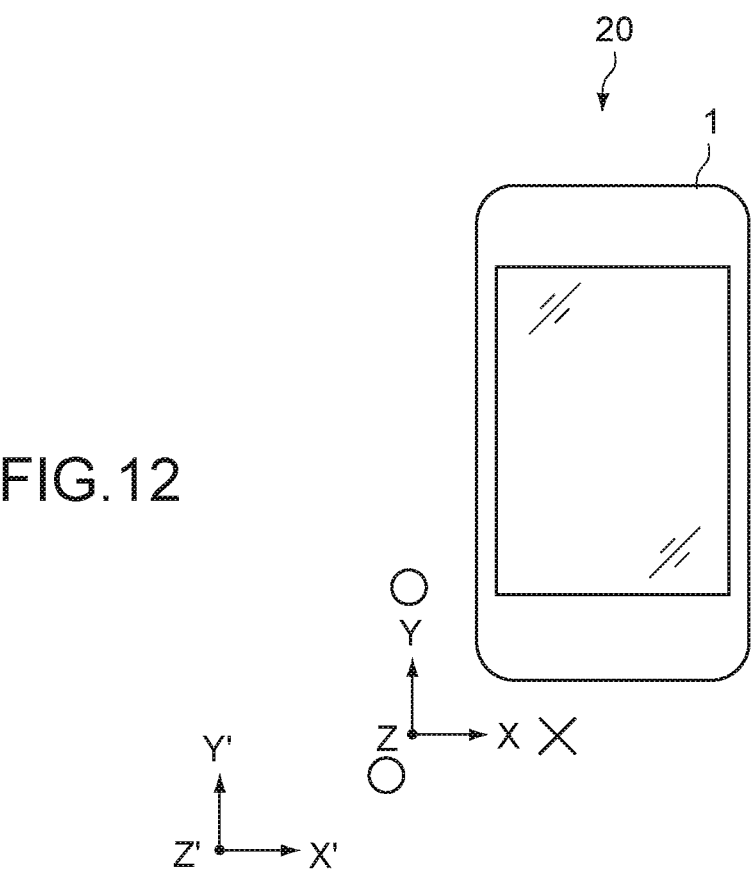
FIG. 12 is a front view showing a smartphone according to a third embodiment of the present technology.

Next, a third embodiment of the present technology will be described. FIG. 12 is a front view showing the smartphone 20 according to the third embodiment.

In the third embodiment, although the housing 1 can be vibrated in the two axial directions, i.e., the long side direction (Y axis direction) and the thickness direction (Z axis direction) in the housing coordinate system (see, a circle mark in FIG. 12), the housing 1 cannot be vibrated in the short side direction (X axis direction) (see a cross mark). That is, in this third embodiment, the first actuator 13a is not installed.

In the third embodiment, although the axial direction in which the housing 1 can be vibrated is different from that in the second embodiment, the basic processing is similar to that in the second embodiment. Therefore, the processing of the control unit 8 will be described with reference to FIG. 11.

In the case where the housing 1 is placed in a certain place (YES in Step 202) when there has been an incoming call (YES in Step 201), which of the long side direction (Y axis direction) and the thickness direction (Z axis direction) of the housing 1 is closer to the direction of gravity is determined (Step 204).

Then, the housing 1 is vibrated in one axial direction of the long side direction(Y axis direction) and the thickness direction (Z axis direction) of the housing 1, which is closer to the direction of gravity (Step 205). For example, in the case where the housing 1 is placed as shown in FIG. 5, since the long side direction (Y axis direction) is closer to the direction of gravity (Z' axis direction) than the thickness direction (Z axis direction), the housing 1 is vibrated in the long side direction. Meanwhile, in the case where the housing 1 is placed as shown in FIG. 6, since the thickness direction (Z axis direction) is closer to the direction of gravity (Z' axis direction) than the long side direction (Y axis direction), the housing 1 is vibrated in the thickness direction.

Note that in the case where the housing 1 is placed as shown in FIG. 4, since there is no superiority relationship between the long side direction (Y axis direction) and the thickness direction (Z axis direction), the housing 1 is vibrated in both the long side direction (Y axis direction) and the thickness direction (Z axis direction). Alternatively, the housing 1 may be vibrated in one direction set in advance among the long side direction (Y axis direction) and the thickness direction (Z axis direction).

Further, in the case where the housing 1 is held by a user's hand when there has been an incoming call (YES in Step 206), which of the long side direction(Y axis direction) and the thickness direction(Z axis direction) of the housing 1 is closer to the horizontal direction is determined (Step 208).

Then, the housing 1 is vibrated in one axial direction of the long side direction (Y axis direction) and the thickness direction (Z axis direction) of the housing 1, which is closer to the horizontal direction (Step 209). For example, for example, in the case where the housing 1 is held as shown in FIG. 8, since the long side direction (Y axis direction) is closer to the horizontal direction (direction in the X'Y' plane) than the thickness direction (Z axis direction), the housing 1 is vibrated in the long side direction.

Meanwhile, in the case where the housing 1 is held as shown in FIG. 7, since the thickness direction (Z axis direction) is closer to the horizontal direction (direction in the X'Y' plane) than the long side direction (Y axis direction), the housing 1 is vibrated in the thickness direction. Note that as described above, a person has such a characteristic that he/she is likely to sense the vibration in the depth direction viewed from the user next to the vibration in the lateral direction viewed from the user, this vibration method fits into this characteristic.

Here, assumption is made that in FIG. 7, the user has lowered the upper side of the housing 1 in FIG. 7 toward the downward direction, and the housing 1 has been rotated about the X axis. In this case, in the case where the XY plane of the housing 1 is inclined with respect to the direction of gravity (Z' axis) by 45° or more, the long side direction (Y axis direction) of the housing 1 is closer to the horizontal direction than the thickness direction (Z axis direction) of the housing 1. In this case, the housing 1 is vibrated in the long side direction of the housing 1, i.e., the housing 1 is vibrated in the longitudinal direction viewed from the user. However, the vibration in the longitudinal direction viewed from the user is difficult for the user to sense.

In this regard, in such a case, the following processing may be executed. First, the control unit 8 determines which axial direction is the closest to the horizontal direction (direction in the X'Y' plane) among the three axial directions in the housing coordinate system (the short side direction, the long side direction, and the thickness direction). Then, in the case where the axial direction (i.e., the short side direction) closest to the horizontal direction is a direction in which the vibration unit 12 cannot vibrate the housing 1, the control unit 8 vibrates the housing 1 in the thickness direction.

That is, in the case where the short side direction is the closest to the horizontal direction when the housing 1 is held by the user, it is most effective to vibrate the housing 1 in the short side direction. However, in the third embodiment, the housing 1 cannot be vibrated in the short side direction. In such a case, the housing 1 is vibrated in the thickness direction in which a person is likely to sense vibration next to the short side direction. Accordingly, it is possible to cause the user to easily recognize that the housing 1 is vibrating.

Returning to the description of FIG. 11, in the case where the housing 1 is put in the receptacle 31 of the clothing when there has been an incoming call, (YES in Step 210), the housing 1 is vibrated in the thickness direction (Step 211).

Assumption is made that a predetermined time has elapsed without receiving no response from the user (YES in Step 213) since the vibration of the housing 1 is started in Step 205, 209, or 211. In this case, driving of the remaining one actuator 13 other than the currently driven actuator 13 is started, and the housing 1 is vibrated in two axial directions (that is, the long side direction and the thickness direction) (Step 214) (first mode to second mode).

In the case where the housing 1 is not placed in a certain place, is not held by a hand, and is not put in the receptacle 31 of the clothing, (NO in Step 210), the housing 1 is vibrated in the two axial directions (that is, the long side direction and the thickness direction) from the beginning (Step 217).

Also in this third embodiment, the operation and effect similar to those in the above-mentioned first embodiment are exerted.

<Fourth Embodimen>

Figure 13:
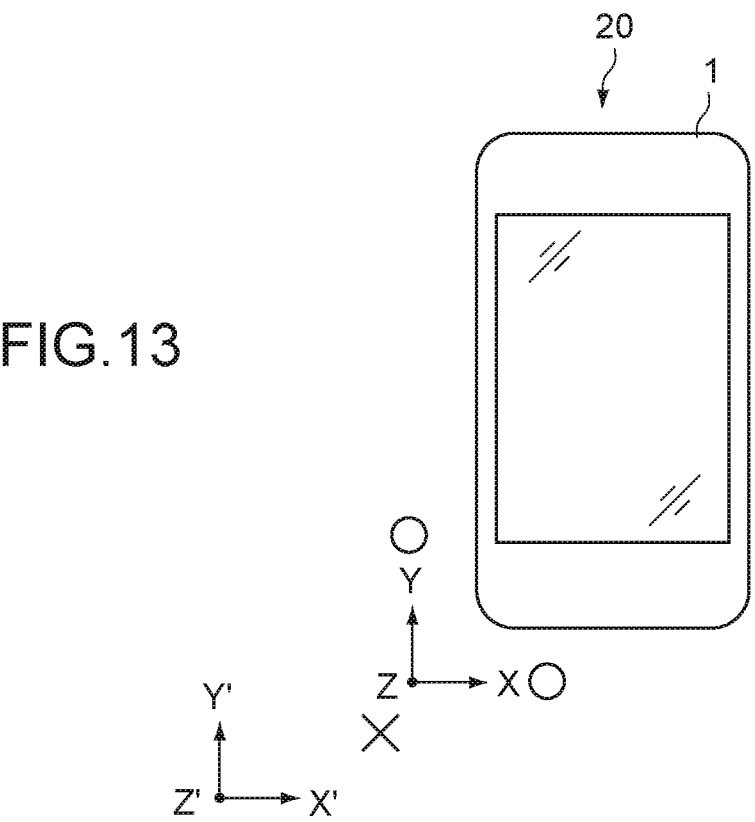
FIG. 13 is a front view of a smartphone according to a fourth embodiment of the present technology.

Next, a fourth embodiment of the present technology will be described. FIG. 13 is a front view showing the smartphone 20 according to the fourth embodiment.

In the fourth embodiment, although the housing 1 can be vibrated in the two axial directions, i.e., the short side direction (X axis direction) and the long side direction (Y axis direction) in the housing coordinate system (see, a circle mark in FIG. 13), the housing 1 cannot be vibrated in the thickness direction (Z axis direction) (see a cross mark). That is, in this fourth embodiment, the third actuator 13c is not installed.

In the fourth embodiment, although the axial direction in which the housing 1 can be vibrated is different from those in the second embodiment and the third embodiment, the basic processing is similar to those in the second embodiment and the third embodiment. Therefore, the processing of the control unit 8 will be described with reference to FIG. 11. Note that in the description of the fourth embodiment, Step 211 in FIG. 11 is replaced with "the housing 1 is vibrated in the short side direction".

In the case where the housing 1 is placed in a certain place (YES in Step 202) when there has been an incoming call (YES in Step 201), which of the short side direction (X axis direction) and the long side direction (Y axis direction) is closer to the direction of gravity is determined (Step 204).

Then, the housing 1 is vibrated in one axial direction of the short side direction (X axis direction) and the long side direction (Y axis direction) of the housing 1, which is closer to the direction of gravity (Step 205). For example, in the case where the housing 1 is placed as shown in FIG. 4, since the short side direction (X axis direction) is closer to the direction of gravity (Z' axis direction) than the long side direction (Y axis direction), the housing 1 is vibrated in the short side direction. Meanwhile, in the case where the housing 1 is placed as shown in FIG. 5, since the long side direction (Y axis direction) is closer to the direction of gravity (Z' axis direction) than the short side direction (X axis direction), the housing 1 is vibrated in the long side direction.

Note that in the case where the housing 1 is placed as shown in FIG. 6, there is not superiority relationship between the short side direction (X axis direction) and the long side direction (Y axis direction), the housing 1 is vibrated in both the short side direction (X axis direction) and the long side direction (Y axis direction). Alternatively, the housing 1 may be vibrated in one direction set in advance among the short side direction (X axis direction) and the long side direction (Y axis direction).

Further, in the case where the housing 1 is held by a user's hand when there has been an incoming call (YES in Step 206), which of the short side direction (X axis direction) and the long side direction (Y axis direction) of the housing 1 is closer to the horizontal direction is determined (Step 208).

Then, the housing 1 is vibrated in one axial direction of the short side direction (X axis direction) and the long side direction (Y axis direction) of the housing 1, which is closer to the horizontal direction (Step 209). For example, in the case where the housing 1 is held as shown in FIG. 7, since the short side direction (X axis direction) is closer to the horizontal direction (direction in the X'Y' plane) than the long side direction (Y axis direction), the housing 1 is vibrated in the short side direction.

Meanwhile, in the case where the housing 1 is held as shown in FIG. 8, since the long side direction (Y axis direction) is closer to the horizontal direction (direction in the X'Y' plane) than the short side direction (X axis direction), the housing 1 is vibrated in the long side direction.

In the case where the housing 1 is put in the receptacle 31 of the clothing when there has been an incoming call (YES in Step 210), the housing 1 is vibrated in the short side direction (Step 211). In the case where the housing 1 is put in the receptacle 31 of the clothing, the housing 1 may be vibrated in the long side direction, or the housing 1 may be vibrated in the two axial directions, i.e., the short side direction (X axis direction) and the long side direction (Y axis direction).

Assumption is made that a predetermined time has elapsed without receiving no response from the user (YES in Step 213) since the vibration of the housing 1 is started in Step 205, 209, or 211. In this case, driving of the remaining one actuator 13 other than the currently driven actuator 13 is started, and the housing 1 is vibrated in two axial directions (that is, the short side direction and the long side direction) (Step 214) (first mode to second mode).

In the case where the housing 1 is not placed in a certain place, is not held by a hand, and is not put in the receptacle 31 of the clothing, (NO in Step 210), the housing 1 is vibrated in the two axial directions (that is, the short side direction and the long side direction) from the beginning (Step 217).

Also in this fourth embodiment, the operation and effect similar to those in the above-mentioned first embodiment are exerted.

<Various Modified Examples>

In the above description, the case where the housing 1 is vibrated in one axial direction closer to the direction of gravity among the three axial directions (or two axial directions) in which the housing is can be vibrated in the housing coordinate system when the housing 1 is placed in a certain place has been described. Meanwhile, in the case where the three axial directions (two axial directions) in which the housing is can be vibrated in the housing coordinate system are each inclined with respect to the direction of gravity by a predetermined angle (e.g., approximately 20°) or more, the housing 1 may be vibrated in the two or more axial directions in the housing coordinate system, and the composite vibration may cause the housing 1 to vibrate in the direction of gravity.

Figures 14, 15:
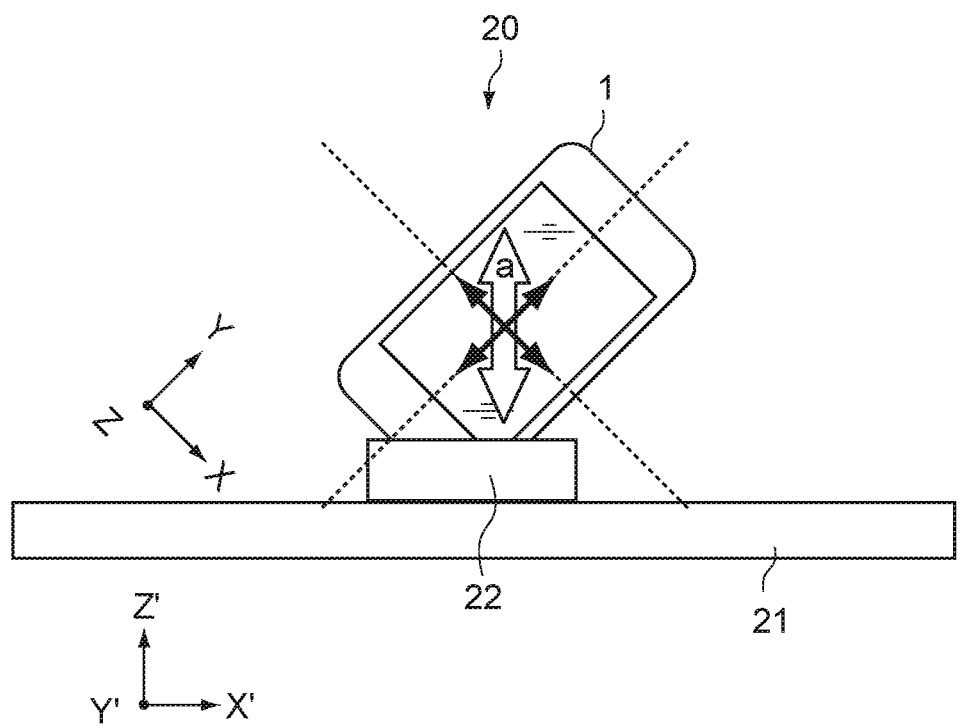
FIG. 14 is a diagram showing a state where the housing is vibrated in two or more axial directions in a housing coordinate system and the composite vibration thereof causes the housing to vibrate in the direction of gravity.
FIG. 15 is a diagram showing an example of a UI (user interface) displayed on a screen for the user to arbitrarily switch between the first mode and the second mode.

FIG. 14 is a diagram showing a state where the housing 1 is vibrated in two or more axial directions in the housing coordinate system and the composite vibration causes the housing 1 to vibrate in the direction of gravity. Note that in the description of FIG. 14, assumption is made that the housing 1 can be vibrated in at least the short side direction and the long side direction of the housing 1 (see the first embodiment and the fourth embodiment).

In the example shown in FIG. 14, an example of the case where the short side direction and the long side direction of the housing 1 are inclined with respect to the direction of gravity by the angle of 45° and the thickness direction is inclined with respect to the direction of gravity by the angle of 90° is shown.

In the case where the housing 1 is placed as shown in FIG. 14, the control unit 8 determines that the three axial directions (two axial directions) in which the housing 1 can be vibrated in the housing coordinate system are each inclined with respect to the direction of gravity by a predetermined angle (e.g., approximately 20°). Then, in this case, the control unit 8 calculates, on the basis of $a=\alpha X+\beta Y$, a vibration amount $\alpha$ in the short side direction and a vibration amount $\beta$ in the long side direction (in the example shown in FIG. 14, $\alpha:\beta=1:1$). Then, the control unit 8 vibrates the housing 1 in both the short side direction and the long side direction by the vibration amounts, and the composite vibration causes the housing 1 to vibrate in the direction of gravity.

Accordingly, it is possible to appropriately vibrate the housing 1 in the direction of gravity also in the case where the three axial directions (or two axial directions) in which the housing 1 can be vibrated in the housing coordinate system are away from the direction of gravity by a predetermined angle or more. Accordingly, the vibration of the housing 1 is more likely to be transmitted to the place where the housing 1 is placed, and the user is capable of easily recognizing that the housing 1 is vibrating even in the case where the user is away from the smartphone 20.

Similar processing may be executed also in the case where the housing 1 is held by the user. That is, in the case where the three axial directions (two axial directions) in which the housing 1 can be vibrated in the housing coordinate system are each inclined with respect to the horizontal direction by a predetermined angel (e.g., approximately 20°) or more, the housing 1 may be vibrated in the two or more axial directions in the housing coordinate system and the composite vibration may cause the housing 1 to vibrate in the horizontal direction.

For example, a case where the housing 1 is rotated around the Z axis by a predetermined angle (e.g., approximately 20°) or more from the state shown in FIG. 7 and held by the user is assumed. In this case, the control unit 8 determines that the three axial directions (or two axial directions) in which the housing 1 can be vibrated in the housing coordinate system are each inclined with respect to the horizontal direction by a predetermined angle (e.g., approximately 20°) or more. In this case, the control unit 8 calculates, on the basis of $a=\alpha X+\beta Y$, the vibration amount $\alpha$ in the short side direction and the vibration amount $\beta$ in the long side direction. Then, the control unit 8 vibrates the housing 1 in both the short side direction and the long side direction by the vibration amounts, and the composite vibration causes the housing 1 in the horizontal direction.

Accordingly, it is possible to appropriately vibrate the housing 1 in the horizontal direction also in the case where the three axial directions (or two axial directions) in which the housing 1 can be vibrated in the housing coordinate system are away from the horizontal direction by a predetermined angle or more. Accordingly, the user is capable of easily recognizing that the housing 1 is vibrating also in the case where the user holds the housing 1.

In the above description, the case where the housing 1 is vibrated when there has been an incoming call by a telephone call has been described. Meanwhile, the case where the housing 1 is vibrated is not limited to the case where there has been an incoming call by a telephone call. For example, the housing 1 may be vibrated in the case where there has been an incoming call by mail, and the housing 1 may be vibrated in accordance with the rhythm of music during reproduction of music. Alternatively, in the case where a game is activated, the housing 1 may be vibrated in accordance with action in the game. Alternatively, the housing 1 may be vibrated in the case of combinations of two or more examples described here.

In the above description, the case where the first mode is switched to the second mode in the case where a predetermined time has elapsed without receiving no response from the user has been described. Note that as described above the first mode is a mode in which the housing 1 is vibrated, in accordance with the current situation of the housing 1, in one axial direction of the three axial directions (or two axial directions) in which the housing 1 can be vibrated in the housing coordinate system. As described above, the second mode is a mode in which the housing 1 is vibrated in all three (which may be two axial directions in the case where the housing 1 can be vibrated in three axis directions) axial directions (or two directions) in which the housing 1 can be vibrated in the housing coordinate system regardless of the current situation of the housing 1.

Meanwhile, the control unit 8 may switch between the first mode (one axis vibration) and the second mode (all axis vibration) on the basis of a user's instruction. FIG. 15 is a diagram showing an example of a UI (user interface) displayed on a screen for the user to arbitrarily switch between the first mode and the second mode.

In the case where a vibration energy saving mode is set to ON, processing in the first mode (one axis vibration) is executed (see Steps 101 to 111 in FIG. 3 and Steps 201 to 211 in FIG. 11) (set collectively). Meanwhile, in the case where the vibration energy saving mode is set to OFF, processing in the second mode (all axis vibration) is executed (set collectively).

A placing energy saving mode, a holding energy saving mode, and an in-pocket energy saving mode are each an example of the UI for the user to arbitrarily set which of the first mode and the second mode is executed for each current situation of the housing 1. For example, a case where the placing energy saving mode is ON, the holding energy saving mode is OFF, and the in-pocket energy saving mode is OFF is assumed. In this case, the processing in the first mode (one axis vibration) is executed in the case where the housing 1 is placed in a certain place, but the processing in the second mode (all axis vibration) is executed in the case where the housing 1 is held or the housing 1 is put in the receptacle 31 of the clothing.

A notification vibration energy saving mode, a game action vibration energy saving mode, and a music rhythm vibration energy saving mode are each an example of the UI for the user to arbitrarily set which of the first mode and the second mode is executed for each application. For example, a case where the notification vibration energy saving mode is ON, the game action vibration energy saving mode is ON, and the music rhythm vibration energy saving mode is OFF is assumed. In this case, the processing in the first mode (one axis vibration) is executed for vibration in an incoming call by a telephone call or mail and vibration according to the action in a game, but the second mode (all axis vibration) is executed for the vibration according to the music rhythm.

By operating the UI as shown in FIG. 15, the user is capable of arbitrarily switching between the first mode and the second mode.

In the above description, the case where the vibration unit 12 includes the linear vibration-type actuators 13 has been described. Meanwhile, the vibration unit 12 may include a rotary vibration-type actuator (eccentric motor). In this case, for example, one eccentric motor is used instead of the first actuator 13*a* and the second actuator 13*b* (vibration in the X axis direction and the Y axis direction) in the above-mentioned first embodiment (three axis vibration). That is, one eccentric motor is in charge of vibration in two axial directions, i.e., the X axis direction and the Y axis direction. In this case, for example, the eccentric motor is driven in the case where the housing 1 needs to be vibrated in one axial direction of the X axis direction and the Y axis direction in the first embodiment. Note that the one eccentric motor may be in charge of the vibration direction of two axial directions, i.e., the Y axis direction and the Z axis direction, or the Z axis direction and the X axis direction.

In the above description, the case where the directions in which the housing 1 is vibrated are orthogonal to each other has been described. Meanwhile, the directions in which the housing 1 is vibrated are not necessarily orthogonal to each other. In the above description, the case where the shape of the housing 1 is a rectangular shape in a plan view has been described. However, the shape of the housing 1 is not particularly limited. For example, the shape of the housing 1 may be a circular shape, an annular shape, a polygonal shape, a star shape, or the like in a plan view. Further, the housing 1 may be a sphere, a polyhedron, a cone, or the like.

In the above description, as an example of the information processing apparatus, the smartphone 20 has been described. However, the information processing apparatus is not limited to the smartphone 20. Other examples of the information processing apparatus include a mobile phone other than the smartphone 20, a portable game machine, a portable music player, a tablet PC (personal computer), a wearable apparatus (wristband type, neck hanging type, head mounted type, etc.).

Further, the processing of the control unit 8 described above may be executed by the control unit 8 in a server apparatus (an example of the information processing apparatus) on a network. In this case, for example, pieces of information (information of the motion sensor 4, the proximity sensor 3, the CCD sensor, and the like) necessary for determining the current situation of the housing 1, the direction of gravity, the horizontal direction, and the like are transmitted from a terminal such as the smartphone 20 to the server apparatus. The control unit 8 of the server apparatus determines, on the basis of this information, the current situation of the housing 1, the direction of gravity, the horizontal direction, and the like, and determines the direction in which the housing 1 is vibrated. Then, the server apparatus transmits the information regarding the direction in which the housing 1 is vibrated or the like to the terminal such as the smartphone 20.

The present technology may also take the following configurations.

(1) An information processing apparatus, including:
a housing having a first direction, and a second direction different from the first direction;
a sensor provided in the housing;
a vibration unit capable of vibrating the housing in the first direction and the second direction; and
a control unit that determines a current situation of the housing on a basis of output from the sensor, and controls, on a basis of the current situation of the housing, the vibration unit to vibrate the housing in one of the first direction and the second direction.

(2) The information processing apparatus according to (1) above, in which
the control unit determines, on a basis of the output from the sensor, whether or not the housing is placed in a certain place, and vibrates, where the housing is placed in the certain place, the housing in one direction of the first direction and the second direction, the one direction being closer to a direction of gravity.

(3) The information processing apparatus according to (2) above, in which
the housing has a thickness direction,
the first direction is the thickness direction, and
the second direction is a specific direction in a plane orthogonal to the thickness direction.

(4) The information processing apparatus according to (2) above, in which
the housing has a thickness direction, and
the first direction and the second direction are directions orthogonal to each other in a plane orthogonal to the thickness direction.

(5) The information processing apparatus according to (4) above, in which
the housing has a short side direction and a long side direction in the plane,
the first direction is the short side direction, and
the second direction is the long side direction.

(6) The information processing apparatus according to any one of (2) to (5) above, in which
the control unit determines, where the housing is placed in the certain place, whether or not both of the first direction and the second direction are away from the direction of gravity by a predetermined angle or more, and vibrates, where the both of the first direction and the second direction are away from the direction of gravity by the predetermined angle or more, the housing in the direction of gravity with composite vibration in the first direction and the second direction.

(7) The information processing apparatus according to (1) or (2) above, in which
the control unit determines, on a basis of the output from the sensor, whether or not the housing is held by a user's hand, and vibrates, where the housing is held by the user's hand, the housing in one direction of the first direction and the second direction, the one direction being closer to a horizontal direction.

(8) The information processing apparatus according to (7) above, in which
the housing has a thickness direction,
the first direction is the thickness direction, and
the second direction is a first specific direction in a plane orthogonal to the thickness direction.

(9) The information processing apparatus according to (8) above, in which
the housing has a third direction different from the first direction and the second direction,
the third direction is a second specific direction orthogonal to the first specific direction in the plane orthogonal to the thickness direction,
the vibration unit is not configured to be capable of vibrating the housing in the second specific direction, and
the control unit vibrates, where the second specific direction in which the vibration unit cannot vibrate the housing among the thickness direction, the first specific direction in the plane, and the second specific direction in the plane is the closest to the horizontal direction, the housing in the thickness direction.

(10) The information processing apparatus according to (7) above, in which
the housing has a thickness direction,
the first direction and the second direction are direction orthogonal to each other in a plane orthogonal to the thickness direction.

(11) The information processing apparatus according to (10) above, in which
the housing has a short side direction and a long side direction in the plane,
the first direction is the short side direction, and
the second direction is the long side direction.

(12) The information processing apparatus according to any one of (7) to (11), in which
the control unit determines, where the housing is held by a user's hand, whether or not both of the first direction and the second direction are away from the horizontal direction by a predetermined angle or more, and vibrates, where the both of the first direction and the second direction are away from the horizontal direction by the predetermined angle or more, the housing in the horizontal direction with composite vibration in the first direction and the second direction.

(13) The information processing apparatus according to (1), (2), or (7) above, in which
the housing has a thickness direction,
the first direction is the thickness direction, and
the control unit determines, on a basis of the output from the sensor, whether or not the housing is put in a receptacle of clothing of a user, and vibrates, where the housing is put in the receptacle, the housing in the thickness direction.

(14) The information processing apparatus according to any one of (1) to (13) above, in which
the control unit switches between a first mode and a second mode on a basis of the current situation of the housing, the housing being vibrated in one of the first direction and the second direction in the first mode, the housing being vibrated in both the first direction and the second direction regardless of the current situation of the housing in the second mode.

(15) The information processing apparatus according to (14) above, in which
the control unit determines whether or not a predetermined time has elapsed since processing of vibrating the housing in the first mode is started, and switches, where there is no response from a user even after the predetermined time has elapsed, the first mode to the second mode.

(16) The information processing apparatus according to (14) or (15) above, in which
the control unit switches between the first mode and the second mode on a basis of an instruction from a user.

(17) The information processing apparatus according to any one of (1) to (16) above, in which
the housing has a third direction different from the first direction and the second direction,
the vibration unit is capable of vibrating the housing in the third direction, and
the control unit controls, on a basis of the current situation of the housing, the vibration unit to vibrate the housing in one of the first direction, the second direction, and the third direction.

(18) An information processing apparatus, including
a control unit that
   determines, on a basis of output from a sensor provided in a housing having a first direction, and a second direction different from the first direction, a current situation of the housing, and
   controls a vibration unit capable of vibrating, on a basis of the current situation of the housing, the housing in the first direction and the second direction so that the housing is vibrated in one of the first direction and the second direction.

(19) An information processing method, including
determining, on a basis of output from a sensor provided in a housing having a first direction, and a second direction different from the first direction, a current situation of the housing, and
controlling a vibration unit capable of vibrating, on a basis of the current situation of the housing, the housing in the first direction and the second direction so that the housing is vibrated in one of the first direction and the second direction.

(20) A program that causes a computer to execute the steps of:
   determining, on a basis of output from a sensor provided in a housing having a first direction, and a second direction different from the first direction, a current situation of the housing, and
   controlling a vibration unit capable of vibrating, on a basis of the current situation of the housing, the housing in the first direction and the second direction so that the housing is vibrated in one of the first direction and the second direction.

REFERENCE SIGNS LIST 1 housing
3 proximity sensor
4 motion sensor
5 imaging unit
8 control unit
12 vibration unit
13 actuator
20 smartphone

The invention claimed is:
1. An information processing apparatus, comprising:
a housing;
a sensor in the housing;
a vibration unit configured to vibrate the housing in a plurality of directions, wherein the plurality of directions is different from each other; and
a control unit configured to:
   determine a current position of the housing based on an output from the sensor;
   determine, based on the current position of the housing, whether the housing is in a certain place;
   select, based on the determination that the housing is in the certain place, an axial direction from the plurality of the directions, wherein the axial direction is closest to a direction of gravity; and
   control, based on the selection, the vibration unit to vibrate the housing in the axial direction.

2. The information processing apparatus according to claim 1, wherein
the plurality of directions comprises a first direction and a second direction,
the first direction is a thickness direction of the housing, and
the second direction is a specific direction in a plane orthogonal to the thickness direction.

3. The information processing apparatus according to claim 1, wherein
the plurality of directions comprises a first direction and a second direction, and
the first direction is orthogonal to the second direction in a plane orthogonal to a thickness direction of the housing.

4. The information processing apparatus according to claim 3, wherein
the first direction is a short side direction of the housing, and
the second direction is a long side direction of the housing.

5. The information processing apparatus according to claim 1, wherein the control unit is further configured to:
   determine, based on the determination that the housing is in the certain place, whether the plurality of directions is away from the direction of gravity by at least an angle; and
   control, based on the determination that the plurality of directions is away from the direction of gravity by the at least the angle, the vibration unit to vibrate the housing in the direction of gravity with composite vibration in the plurality of directions.

6. The information processing apparatus according to claim 1, wherein the control unit is further configured to:
   determine, based on the output from the sensor, whether the housing is held by a user's hand and
   control, based on the determination that the housing is held by the user's hand, vibration unit to vibrate the housing in one of the plurality of directions, wherein the one of the plurality of directions is closest to a horizontal direction.

7. The information processing apparatus according to claim 6, wherein
the plurality of directions comprises a first direction and a second direction,
the first direction is a thickness direction of the housing, and
the second direction is a first specific direction in a plane orthogonal to the thickness direction.

8. The information processing apparatus according to claim 7, wherein
the plurality of directions further comprises a third direction different from the first direction and the second direction,
the third direction is a second specific direction orthogonal to the first specific direction in the plane orthogonal to the thickness direction,
and
the control unit is further configured to:
   determine whether the vibration unit is able to vibrate the housing in the second specific direction; and
   control, based on the determination that the vibration unit is unable to vibrate the housing in the second specific direction, the vibration unit to vibrate the housing in the thickness direction, wherein
the second specific direction is a direction in which the vibration unit is unable to vibrate the housing among the thickness direction, the first specific direction in the plane, and the second specific direction in the plane is closest to the horizontal direction.

9. The information processing apparatus according to claim 6, wherein the plurality of directions comprises a first direction and a second direction, the first direction is orthogonal to the second direction in a plane orthogonal to a thickness direction of the housing.

10. The information processing apparatus according to claim 9, wherein, the first direction is a short side direction of the housing, and the second direction is a long side direction of the housing.

11. The information processing apparatus according to claim 6, wherein the control unit is further configured to:

determine, based on the determination that the housing is held by the user's hand, whether the plurality of directions is away from the horizontal direction by at least an angle; and control the vibration unit to vibrate, based on the determination that the plurality of directions is away from the horizontal direction by the at least the angle, the housing in the horizontal direction with composite vibration in the plurality of directions.

12. The information processing apparatus according to claim 1, wherein the plurality of directions comprises a first direction and a second direction, the first direction is a thickness direction of the housing, and the control unit is further configured to:

determine, based on the output from the sensor, whether the housing is in a receptacle of clothing of a user; and control the vibration unit to vibrate, based on the determination that the housing is put in the receptacle, the housing in the thickness direction.

13. The information processing apparatus according to claim 1, wherein the control unit is further configured to switch between a first mode and a second mode based on the current position of the housing, the housing is vibrated in one of the plurality of directions in the first mode, the housing is vibrated in each of the plurality of directions regardless of the current position of the housing in the second mode.

14. The information processing apparatus according to claim 13, wherein the control unit is further configured to:

determine whether a time has elapsed since a start of the vibration of the housing in the first mode; and switch, based on non-response from a user after the time has elapsed, the first mode to the second mode.

15. The information processing apparatus according to claim 13, wherein the control unit is further configured to switch between the first mode and the second mode based on an instruction from a user.

16. The information processing apparatus according to claim 1, wherein, the vibration unit is further configured to vibrate the housing in a first direction different from the plurality of directions, and the control unit is further configured to control, based on the current position of the housing, the vibration unit to vibrate the housing in one of the first direction or one of the plurality of directions.

17. An information processing apparatus, comprising:

a control unit configured to:

determine, based on an output from a sensor in a housing, a current position of the housing;

determine, based on the current position of the housing, whether the housing is in a certain place;

select, based on the determination that the housing is in the certain place, an axial direction from a plurality of directions, wherein the axial direction is closest to a direction of gravity; and control a vibration unit to vibrate, based on the selection, the housing in the axial direction.

18. An information processing method, comprising determining, based on an output from a sensor in a housing, a current position of the housing;

determining, based on the current position of the housing, whether the housing is in a certain place;

selecting, based on the determination that the housing is in the certain place, an axial direction from a plurality of directions, wherein the axial direction is closest to a direction of gravity; and controlling a vibration unit to vibrate, based on the selection, the housing in the axial direction.

19. A non-transitory computer-readable medium having stored thereon computer-executable instructions that, when executed by a processor, cause the processor to execute operations, the operations comprising:

determining, based on an output from a sensor in a housing, a current position of the housing, determining, based on the current position of the housing, whether the housing is in a certain place;

selecting, based on the determination that the housing is in the certain place, an axial direction from a plurality of directions, wherein the axial direction is closest to a direction of gravity; and controlling a vibration unit to vibrate, based on the selection, the housing in the axial direction.

* * * * *